(12) United States Patent
Han et al.

(10) Patent No.: US 11,290,370 B2
(45) Date of Patent: Mar. 29, 2022

(54) APPARATUS AND METHOD FOR TRANSMITTING CONTENT

(71) Applicant: SAMSUNG SDS CO., LTD., Seoul (KR)

(72) Inventors: Young Tae Han, Seoul (KR); Jong Ho Kim, Seoul (KR); Han Some Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 22 days.

(21) Appl. No.: 16/881,363

(22) Filed: May 22, 2020

(65) Prior Publication Data

US 2020/0382409 A1 Dec. 3, 2020

(30) Foreign Application Priority Data

May 27, 2019 (KR) .................. 10-2019-0061930

(51) Int. Cl.
*H04L 12/727* (2013.01)
*H04L 12/803* (2013.01)
(Continued)

(52) U.S. Cl.
CPC ........ *H04L 45/121* (2013.01); *H04L 43/0858* (2013.01); *H04L 43/0888* (2013.01); *H04L 43/0894* (2013.01); *H04L 47/125* (2013.01)

(58) Field of Classification Search
CPC ............. H04L 45/121; H04L 43/0858; H04L 43/0888; H04L 43/0894; H04L 47/125;
(Continued)

(56) References Cited

U.S. PATENT DOCUMENTS 9,118,680 B1 * 8/2015 Dunlap .................. H04L 65/80
9,407,716 B1 * 8/2016 Desai ..................... G06F 16/172
(Continued)

FOREIGN PATENT DOCUMENTS

EP 2081363 A1 7/2009
KR 10-0824030 B1 4/2008

OTHER PUBLICATIONS

European Search Report for EP20176492.5 dated Aug. 13, 2020 from European patent office in a counterpart European patent application.
(Continued)

*Primary Examiner* — Chi H Pham
*Assistant Examiner* — Vladislav Y Agureyev
(74) *Attorney, Agent, or Firm* — The PL Law Group, PLLC

(57) ABSTRACT

An apparatus for transmitting content includes a content request transmitter to transmit a request message for content requested by a client device to content servers, a response delay time calculator to calculate a response delay time of each content server on the basis of a response message of each content server for the request message, a byte range determiner to determine one or more content servers to which a byte range request for the content is to be transmitted, from among the content servers, on the basis of the response message and/or the response delay time and determine a size of a byte range request and the number of byte range request for each content server, and a content acquirer to acquire the content from the content servers through the byte range request based on the size of a byte range request and the number of byte range requests.

10 Claims, 10 Drawing Sheets

(51) Int. Cl.
*H04L 45/121* (2022.01)
*H04L 43/0852* (2022.01)
*H04L 43/0888* (2022.01)
*H04L 43/0894* (2022.01)
*H04L 47/125* (2022.01)

(58) Field of Classification Search
CPC ............. H04L 67/1097; H04L 67/2842; H04L 67/1002; H04L 67/1014; H04L 61/1511
See application file for complete search history.

(56) References Cited

U.S. PATENT DOCUMENTS

| | | | | |
|---|---|---|---|---|
| 9,948,740 | B1* | 4/2018 | Benson | H04L 67/1097 |
| 2007/0288484 | A1* | 12/2007 | Yan | H04L 67/1019 |
| 2010/0306373 | A1* | 12/2010 | Wormley | H04L 67/1002 |
| | | | | 709/224 |
| 2013/0066951 | A1* | 3/2013 | Agranat | H04J 14/0257 |
| | | | | 709/203 |
| 2013/0179541 | A1* | 7/2013 | Chen | H04L 65/608 |
| | | | | 709/219 |
| 2014/0297869 | A1* | 10/2014 | Brueck | H04L 65/607 |
| | | | | 709/226 |
| 2014/0365501 | A1* | 12/2014 | Ueno | G06F 16/183 |
| | | | | 707/747 |
| 2015/0074234 | A1* | 3/2015 | Kim | H04L 67/2842 |
| | | | | 709/219 |
| 2015/0149581 | A1* | 5/2015 | Brown | H04L 67/2842 |
| | | | | 709/217 |
| 2015/0222681 | A1* | 8/2015 | Basile | H04L 65/60 |
| | | | | 709/219 |
| 2015/0271226 | A1* | 9/2015 | Luby | H04L 47/125 |
| | | | | 709/231 |
| 2015/0271232 | A1* | 9/2015 | Luby | H04L 65/80 |
| | | | | 709/231 |
| 2015/0333986 | A1* | 11/2015 | Pang | H04L 43/065 |
| | | | | 370/252 |
| 2015/0382034 | A1* | 12/2015 | Thangaraj | H04L 67/2814 |
| | | | | 709/231 |
| 2016/0072864 | A1* | 3/2016 | Houdaille | H04N 21/44004 |
| | | | | 709/231 |
| 2016/0261510 | A1* | 9/2016 | Burnette | H04L 47/25 |
| 2017/0054800 | A1* | 2/2017 | DiVincenzo | H04N 21/2187 |
| 2017/0208148 | A1* | 7/2017 | Bran | H04L 67/06 |
| 2017/0251068 | A1* | 8/2017 | Kappler | H04L 67/20 |
| 2018/0054482 | A1* | 2/2018 | Ruiz | H04L 67/2852 |
| 2018/0241796 | A1* | 8/2018 | Srinivasan | H04L 65/4084 |
| 2019/0075182 | A1 | 3/2019 | Bran et al. | |
| 2019/0243881 | A1* | 8/2019 | Zia | G06F 40/143 |
| 2019/0334770 | A1* | 10/2019 | Xiang | H04L 41/5009 |
| 2020/0028931 | A1* | 1/2020 | Zhu | H04L 67/1097 |
| 2020/0230499 | A1* | 7/2020 | Buser | A63F 13/355 |

OTHER PUBLICATIONS

Pablo Rodriguez et al "Dynamic Parallel Access to Replicated Content in the Internet" IEEE/ACM Transactions on networking, vol. 10, No. 4, 2002, XP011077181.

* cited by examiner

APPARATUS AND METHOD FOR TRANSMITTING CONTENT

CROSS REFERENCE TO RELATED APPLICATIONS AND CLAIM OF PRIORITY

This application claims the benefit under 35 USC § 119(a) of Korean Patent Application No. 10-2019-0061930, filed on May 27, 2019, in the Korean Intellectual Property Office, the entire disclosure of which is incorporated herein by reference for all purposes.

BACKGROUND

1. Field

Disclosed embodiments relate to content delivery technology.

2. Description of Related Art

In order to efficiently receive content, a client receives only a required part of the content from a web server using a byte range request. In addition, when a large amount of content is transferred between a cache server and a web server, the byte range request is utilized for fast transfer of large amount of content.

However, the existing byte range request does not consider the web server environment and network transmission rate. Specifically, a client server or a cache server conventionally divides a single request for a large amount of content into a plurality of byte range requests, and transmits the divided requests to a single web server to receive the content. At this time, the server with a heavy load does not only fail to normally transmit all responses to the plurality of byte range requests, but also causes performance degradation due to the plurality of byte range requests.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for transmitting content.

In an embodiment, there is provided an apparatus for transmitting content including a content request transmitter configured to transmit a request message for content requested by a client device to a plurality of content servers, a response delay time calculator configured to calculate a response delay time of each of the plurality of content servers based on a response message of each of the content servers for the request message, a byte range determiner configured to determine one or more content servers to which a byte range request for the content is to be transmitted, from among the plurality of content servers, based on at least one of the response message and the response delay time and to determine a size of a byte range request and a number of byte range request for each of the one or more content servers, and a content acquirer configured to acquire the content from the one or more content servers through the byte range request based on the size of a byte range request and the number of byte range requests.

The content request transmitter may identify the plurality of content servers to which the request message is to be transmitted by using a domain name system (DNS) lookup.

The content request transmitter may transmit the request message to a load balancer that performs load balancing on the plurality of content servers, receive the response message transmitted by the plurality of content servers from the load balancer, and identify the plurality of content servers to which the request message is to be transmitted based on information included in a header of the received response message.

The byte range determiner may determine the size of a byte range request to be inversely proportional to the response delay time of each of the one or more content servers.

The byte range determiner may determine the number of byte range requests to be proportional to the response delay time of each of the one or more content servers and to be inversely proportional to a number of connections to each of the one or more content servers.

The content acquirer may transmit the byte range request to each of the one or more content servers as many as the number of byte range requests of each of the one or more content servers and receive data for the content corresponding to the size of the byte range request of each of the one or more content servers out of a total size of the content from each of the one or more content servers, wherein the data for the content is divided by the number of byte range requests of each of the one or more content servers.

The content acquirer may acquire the content by combining the data for the content received from each of the one or more content servers.

In another embodiment, there is provided a method of transmitting content including transmitting a request message for content requested by a client device to a plurality of content servers, calculating a response delay time of each of the plurality of content servers based on a response message of each of the content servers for the request message, determining one or more content servers to which a byte range request for the content is to be transmitted, from among the plurality of content servers, based on at least one of the response message and the response delay time, determining a size of a byte range request and a number of byte range request for each of the one or more content servers, and acquiring the content from the one or more content servers through the byte range request based on the size of a byte range request and the number of byte range requests.

The transmitting of the request message may include identifying the plurality of content servers to which the request message is to be transmitted by using a DNS lookup.

The transmitting of the request message may include transmitting the request message to a load balancer that performs load balancing on the plurality of content servers, receiving the response message transmitted by the plurality of content servers from the load balancer, and identifying the plurality of content servers to which the request message is to be transmitted based on information included in a header of the received response message.

The determining of the size of a byte range request and the number of byte range requests may include determining the size of a byte range request to be inversely proportional to the response delay time of each of the one or more content servers.

The determining of the size of a byte range request and the number of byte range requests may include determining the number of byte range requests to be proportional to the response delay time of each of the one or more content servers and to be inversely proportional to a number of connections to each of the one or more content servers.

The acquiring may include transmitting the byte range request to each of the one or more content servers as many as the number of byte range requests of each of the one or more content servers and receiving data for the content corresponding to the size of the byte range request of each of the one or more content servers out of a total size of the content from each of the one or more content servers, wherein the data for the content is divided by the number of byte range requests of each of the one or more content servers.

The acquiring may include acquiring the content by combining the data for the content received from each of the one or more content servers.

Other features and aspects will be apparent from the following detailed description, the drawings, and the claims.

Figure 1:
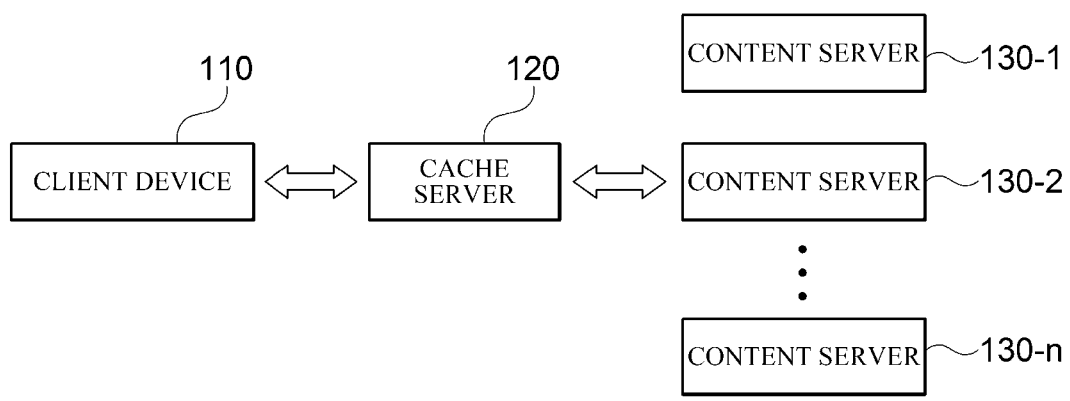
FIG. 1 is a diagram illustrating a configuration of a system for transmitting content according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made based on the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a configuration of a system 100 for transmitting content according to one embodiment.

Referring to FIG. 1, the system 100 for transmitting content includes a client device 110, a cache server 120, and a plurality of content servers 130-1, 130-2, and 130-$n$.

The client device 110 may be a device that receives content provided by the plurality of content servers 130-1, 130-2, and 130-$n$ through the cache server 120. The client device 110 may include, for example, various types of devices, such as a personal computer (PC), a smartphone, and a tablet PC, but is not limited thereto, and may include various other types of devices that each include a display means, an input/output means, an information processing means, and a communication means through a wired/wireless network.

The cache server 120 may be a device that provides content requested by the client device 110 in association with the plurality of content servers 130-1, 130-2, and 130-$n$ through a wired/wireless network.

For example, when the cache server 120 receives an initial request for content from the client device 110, the cache server 120 may transmit a request message for the content requested by the client device 110 to the plurality of content servers 130-1, 130-2, and 130-$n$. Then, the cache server 120 may transmit the content provided from the plurality of content servers 130-1, 130-2, and 130-$n$ to the client device 110 according to the request message. In this case, the cache server 120 may store therein the content provided from the plurality of content servers 130-1, 130-2, and 130-$n$. Accordingly, the cache server 120 may immediately transmit the content when a re-request for the content is received from the client device 110 or a request for the content is received from another client device.

The plurality of content servers 130-1, 130-2, and 130-$n$ may be devices that store and manage content and provide the content according to a content request from the client device 110.

According to one embodiment, the plurality of content servers 130-1, 130-2, and 130-$n$ may be servers connected to the cache server 120 to provide content to the client device 110. For example, the plurality of content servers 130-1, 130-2, and 130-$n$ receive the content request from the client device 110 through the cache server 120, and provide the content requested by the client device 110 through the cache server 120.

Figure 2:
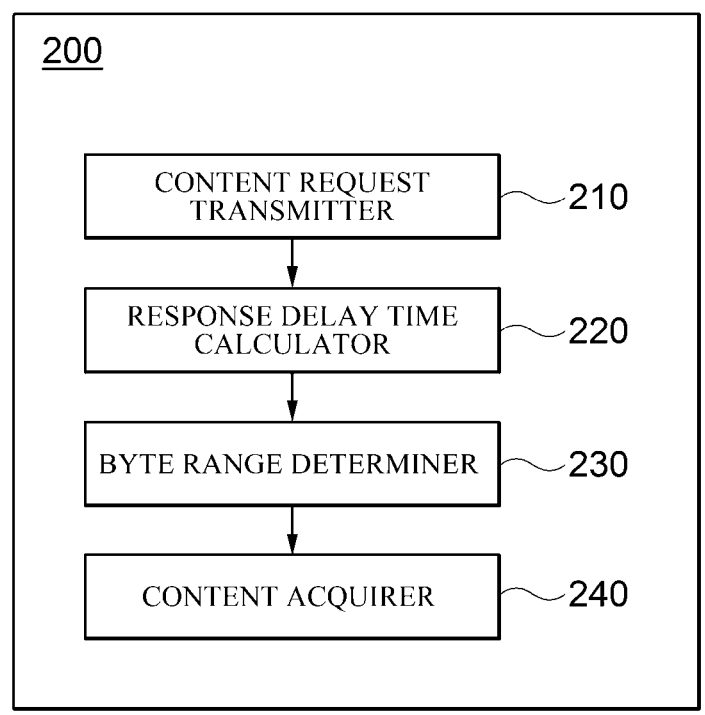
FIG. 2 is a diagram illustrating an apparatus for transmitting content according to one embodiment.

FIG. 2 is a diagram of an apparatus for transmitting content according to one embodiment.

The apparatus 200 illustrated in FIG. 2 may be implemented, for example, as a configuration of the cache server 120 illustrated in FIG. 1.

Referring to FIG. 2, the apparatus 200 for transmitting content includes a content request transmitter 210, a response delay time calculator 220, a byte range determiner 230, and a content acquirer 240.

The content request transmitter 210 transmits a request message for content requested by a client device 110 to a plurality of content servers 130-1, 130-2, and 130-*n*.

For example, the content request transmitter 210 may serve as a backend server to issue a request for content, and preregister the plurality of content servers 130-1, 130-2, and 130-*n*. When there is a request for content from the client device 110, the content request transmitter 210 may inquire a server address of each of the plurality of preregistered content servers 130-1, 130-2, and 130-*n* and transmit a request message to the plurality of content servers 130-1, 130-2, and 130-*n* using the inquired server addresses.

In addition, when there is a request for content from the client device 110, the content request transmitter 210 may identify the plurality of content servers 130-1, 130-2, and 130-*n* to request the content, and transmit a request message.

According to one embodiment, the content request transmitter 210 may identify the plurality of content servers 130-1, 130-2, and 130-*n* to transmit a request message using a domain name system (DNS) lookup.

Figure 3:
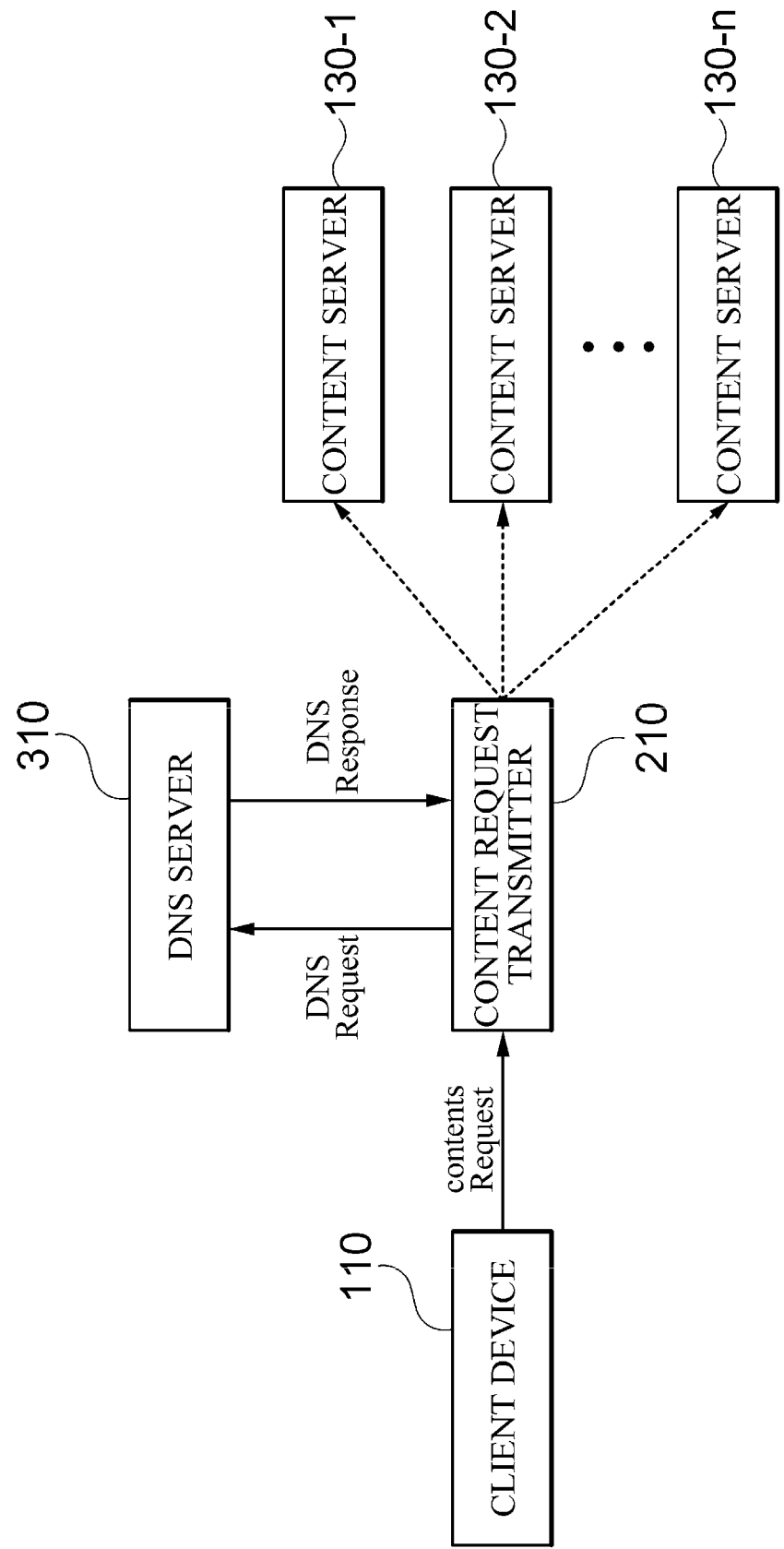
FIG. 3 is a diagram for describing an example of identifying a plurality of content according to one embodiment.

FIG. 3 is a diagram for describing an example of identifying a plurality of content according to one embodiment.

Referring to FIG. 3, when there is a request for content from the client device 110, the content request transmitter 210 may request a DNS server 310 to provide server addresses of one or more of the plurality of content servers 130-1, 130-2, and 130-*n* that provide requested content. The content request transmitter 210 may acquire server addresses of one or more of the plurality of content servers 130-1, 130-2, and 130-*n* from the DNS server 310. In this case, when there are a plurality of requests for content from the client device 110, the content request transmitter 210 may acquire server addresses of the plurality of content servers 130-1, 130-2, and 130-*n* through a plurality of DNS lookups and identify the plurality of content servers 130-1, 130-2, and 130-*n*.

In addition, according to one embodiment, the content request transmitter 210 may transmit a request message to a load balancer that performs load balancing on the plurality of content servers 130-1, 130-2, and 130-*n*, receive response messages, which have been transmitted from the plurality of content servers 130-1, 130-2, and 130-*n*, from the load balancer, and identify the plurality of content servers 130-1, 130-2, and 130-*n* to which the request message is to be transmitted, based on information included in the received response messages. In this case, the load balancer may be, for example, a network device for processing load balancing, such as a L4 switch, a L7 switch, or the like.

Figure 4:
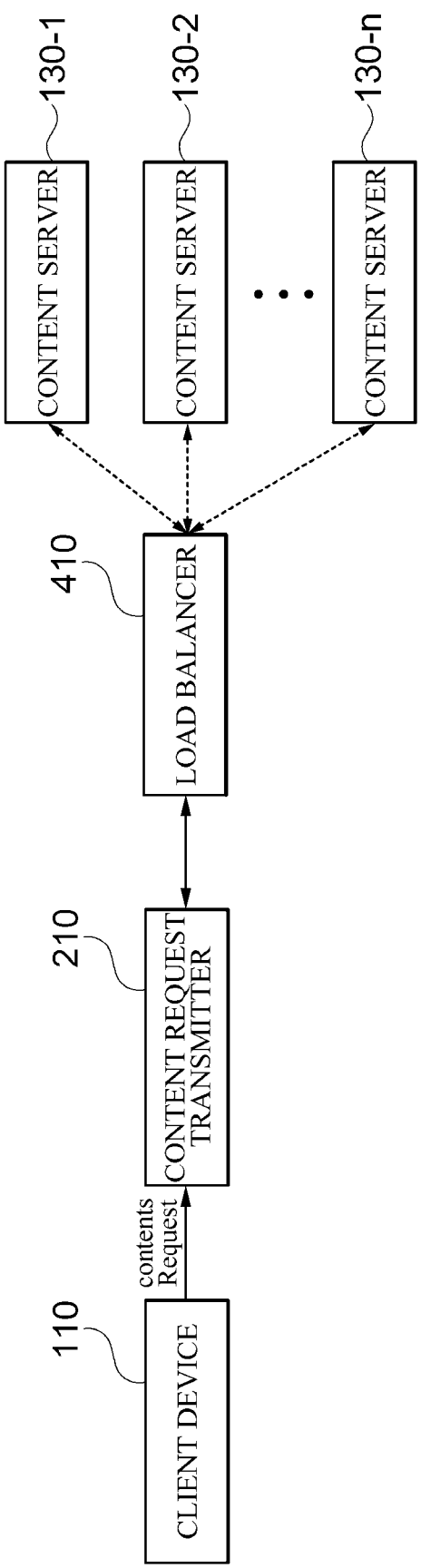
FIG. 4 is a diagram for describing another example of identifying a plurality of content according to one embodiment.

FIG. 4 is a diagram for describing another example of identifying a plurality of content according to one embodiment.

Referring to FIG. 4, when there is a request for content from the client device 110, the content request transmitter 210 may transmit a request message to a load balancer 410. At this time, the load balancer 410 may transmit the request message to the plurality of content servers 130-1, 130-2, and 130-*n* through various load balancing methods, such as round robin, least connection, and the like. Then, the load balancer 410 may receive a response message for the request message from each of the plurality of content servers 130-1, 130-2, and 130-*n*, and deliver the response messages to the content request transmitter 410. The content request transmitter 210 may analyze information included in a header of the received response message, for example, header items of the response message. In this case, the content request transmitter 210 may acquire information on the plurality of content servers 130-1, 130-2, and 130-*n*, such as the number of the content servers 130-1, 130-2, and 130-*n*, by identifying the plurality of content servers 130-1, 130-2, and 130-*n* based on an analysis result regarding the information included in the headers.

Meanwhile, the method of identifying the plurality of content servers 130-1, 130-2, and 130-*n* is not limited to the embodiments illustrated in FIGS. 3 and 4 described above, and may include various known methods capable of identifying the plurality of content servers 130-1, 130-2, and 130-*n*.

In addition, when there is a re-request for the content from the client device 110, the content request transmitter 210 may transmit, to the plurality of content servers 130-1, 130-2, and 130-*n*, a request message that includes information confirming whether the requested content has been modified. For example, the content request transmitter 210 may transmit the request message by including information on the date of transmitting the first request for content or on the date of transmitting a request for the content before re-requesting the content in If-Modified-Since item included in the header of the request message. At this time, the content request transmitter 210 may use a different method of providing content to the client device 110 according to information included in the response messages received from the plurality of content servers 130-1, 130-2, and 130-*n*.

For example, the content request transmitter 210 may receive a response message including information which indicates that the re-requested content has not been changed, for example, 304 HTTP state code, from the plurality of content servers 130-1, 130-2, and 130-*n*. In this case, content previously received from the plurality of content servers 130-1, 130-2, and 130-*n* may be provided to the client device 110. Unlike the above-described example, the content request transmitter 210 may receive a response message which includes information indicating that the re-requested content has been changed from the plurality of content servers 130-1, 130-2, and 130-*n*. In this case, the content request transmitter 210 may perform the following procedures for acquiring the re-requested content.

The response delay time calculator 220 calculates a response delay time of each of the plurality of content servers 130-1, 130-2, and 130-*n* based on the response message of each of the plurality of content servers 130-1, 130-2, and 130-*n* for the request message.

Specifically, the response delay time calculator 220 may calculate the response delay time of each of the plurality of content servers 130-1, 130-2, and 130-*n* using the transmission time of the request message and the reception time or the response message of each of the plurality of content servers 130-1, 130-2, and 130-*n*. For example, the response delay time calculator 220 may determine that a time interval from the time when the request message is transmitted to the time when the response message is received is a response delay time.

In addition, when the content request transmitter 210 receives a response message including information indicating that the re-requested content has been changed from the plurality of content servers 130-1, 130-2, and 130-*n*, a response delay time of each of the plurality of content servers 130-1, 130-2, and 130-*n* may be calculated based on the request message for the re-requested content and the response message of each of the plurality of content servers 130-1, 130-2, and 130-*n* for the request message for the re-requested content.

The byte range determiner 230 may determine one or more content servers to which a byte range request for content is to be transmitted, from among the plurality of content servers 130-1, 130-2, and 130-*n*, based on at least one of the response message and the response delay time, and may determine a size of a byte range request and the number of byte range requests for each of the one or more content servers.

Specifically, the byte range determiner 230 may identify the content server that operates normally and has the requested content among the plurality of content servers 130-1, 130-2, and 130-*n* based on at least one of the response message and the response delay time, and determine one or more content servers to which the byte range request is to be transmitted.

For example, when the response message includes 200 HTTP state code, the byte range determiner 230 may determine that a content server that has transmitted the response message among the plurality of content servers 130-1, 130-2, and 130-*n* is a content server to which the byte range request is to be transmitted. In another example, when the response message includes 404 HTTP state code, the byte range determiner 230 may exclude the content server that has transmitted the response message among the plurality of content servers 130-1, 130-2, and 130-*n* from the content servers to which the byte range request is to be transmitted. In still another example, when the response message includes 500 HTTP state code or a response message has not been received, the byte range determiner 230 may exclude a content server that has transmitted the response message including the 500 HTTP state code among the plurality of content servers 130-1, 130-2, and 130-*n* or a content server that has not transmitted the response message from the content servers to which the byte range request is to be transmitted, or may re-transmit a request message for content to the corresponding content server through the content request transmitter 210.

In addition, the byte range determiner 230 may exclude a content server having a response delay time greater than or equal to a preset value among the plurality of content servers 130-1, 130-2, and 130-*n* from content servers to which a byte range request is to be transmitted.

Accordingly, by determining one or more content servers to which the byte range request is to be transmitted based on at least one of the response message and the response delay time according to the above-described embodiments, it is possible to reduce server overload due to the indiscriminate byte range request.

Meanwhile, according to one embodiment, the byte range determiner 230 may determine the size of the byte range request to be inversely proportional to the response delay time of each of the one or more content servers.

Figure 5:
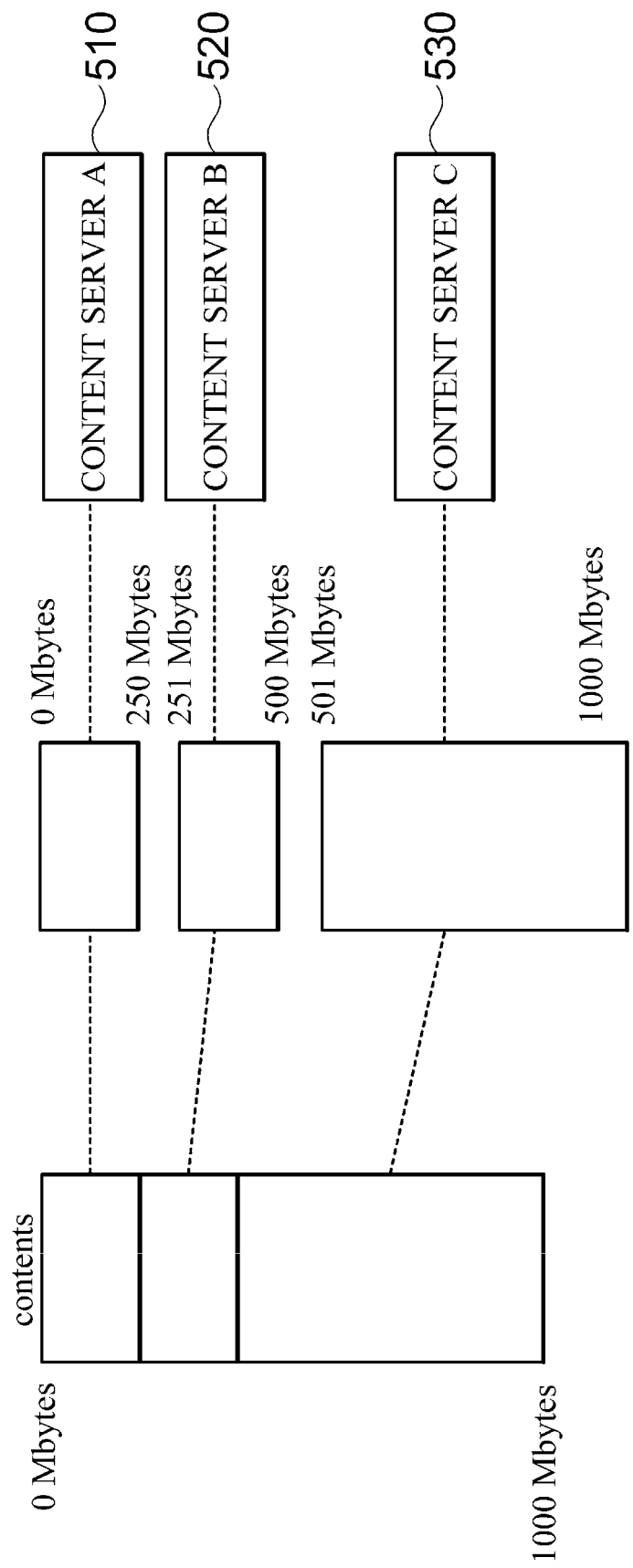
FIG. 5 is a diagram for describing an example of determining a size of a byte range request according to one embodiment.

FIG. 5 is a diagram for describing an example of determining a size of a byte range request according to one embodiment.

Referring to FIG. 5, it is assumed that the response delay times of content server A 510, content server B 520, and content server C 530 are calculated as 200 ms, 200 ms, and 100 ms, respectively, by the response delay time calculator 220. In this case, the byte range determiner 230 may determine sizes of the byte range requests for the content server A, the content server B, and the content server C to be at a ratio of 1:1:2 so as to be inversely proportional to the response delay times of each server. For example, when the size of data for content is identified as 1 Gbytes based on a response message, the byte range determiner 230 may determine the sizes of the byte range requests for the content server A 510, the content server B 520, and the content server C 530 to 250 Mbytes, 250 Mbytes, and 500 Mbytes, respectively.

Meanwhile, according to one embodiment, the byte range determiner 230 may determine the number of the byte range requests to be proportional to the response delay time of each of one or more content servers and to be inversely proportional to the number of connections to each of the one or more content servers. In this case, the number of connections to the content server may be the number of simultaneous connections to the content server and may be set by a user or a server administrator.

For example, as a response delay time of a content server is smaller or the number of connections to the content server is greater, the byte range determiner 230 may determine the number of byte range requests for the corresponding content server to be smaller.

The content acquirer 240 acquires content from one or more content servers through byte range requests based on the size of the byte range request and the number of the byte range requests.

Specifically, the content acquirer 240 may transmit byte range requests to one or more content servers based on the size of the byte range request and the number of the byte range requests for each of the one or more content servers. The content acquirer 240 may receive data for content from each of the one or more content servers based on the byte range requests transmitted to the one or more content servers.

According to one embodiment, the content acquirer 240 may transmit a byte range request to each of the one or more content servers as many as the determined number of byte range requests of each of the one or more content servers, and receive data for content that corresponds to the size of the byte range request of each of the one or more content servers with respect to the total size of the content from each of the one or more content servers.

Figure 6:
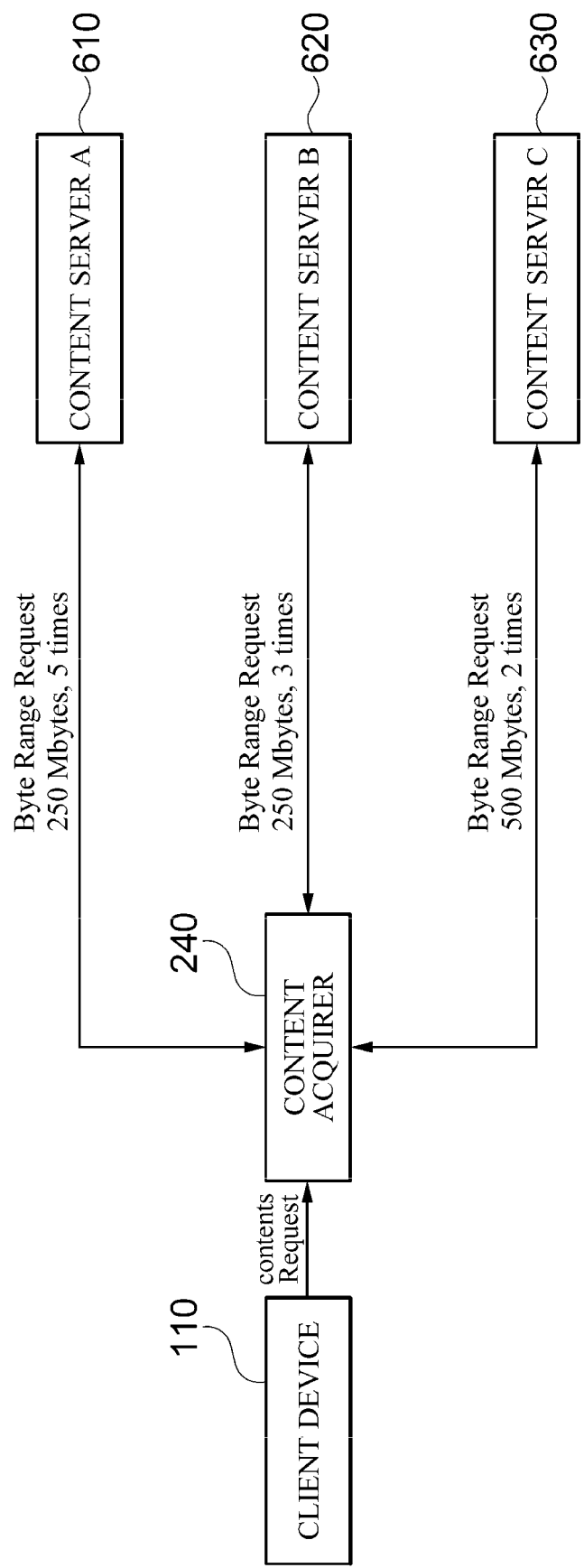
FIG. 6 is a diagram for describing an example of acquiring content by transmitting a byte range request according to one embodiment.

FIG. 6 is a diagram for describing an example of acquiring content by transmitting a byte range request according to one embodiment.

Referring to FIG. 6, it is assumed that the byte range determiner 230 determines the sizes of the byte range requests for content server A 610, content server B 620, and content server C 630 are determined as 250 Mbytes, 250 Mbytes, and 500 Mbytes, respectively, and determines the numbers of byte range requests for the content server A 610, the content server B 620, and the content server C 630 to be 5, 3, and 2, respectively. In this case, the content acquirer 240 may transmit a byte range request for a size of 250 Mbytes out of the total size of data for content to each of the content server A 610 and the content server B 620, wherein the byte range request is transmitted to the content server A 610 five times and the byte range request is transmitted to the content server B 620 three times. In addition, the content acquirer 240 may transmit a byte range request for a size of 500 Mbytes out of the total size of data for content to the content server C 630 two times.

In this case, according to one embodiment, the content acquirer 240 may receive data for content by dividing the data by the number of byte range requests of each of the one or more content servers.

For example, it is assumed that the content acquirer 240 transmits a byte range request for a size of 250 Mbytes out of the total size of data for the content to the content server A 610 five times. At this time, the content acquirer 240 may receive pieces of data for content corresponding to the sizes of 1 to 50, 51 to 100, 101 to 150, 151 to 200, and 201 to 250 Mbytes through five byte range requests for the content server A 610.

Also, according to one embodiment, the content acquirer 240 may acquire content by combining the data for the content received from each of the one or more content servers.

Specifically, the content acquirer 240 may acquire content by combining the data for the content received from each content server into a data size pre-allocated to each content server or by combining the data into a preset chunk size.

Figure 7:
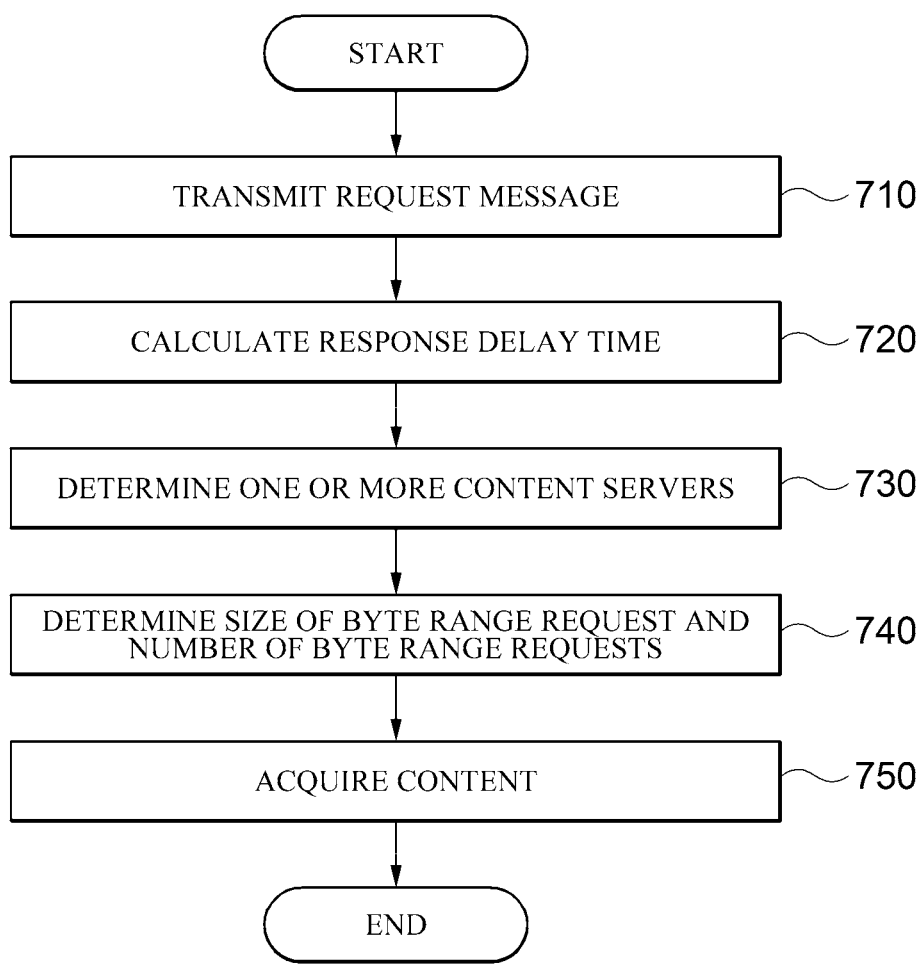
FIG. 7 is a flowchart illustrating a method of transmitting content according to one embodiment.

FIG. 7 is a flowchart illustrating a method of transmitting content according to one embodiment.

The method illustrated in FIG. 7 may be performed, for example, by the apparatus 200 for transmitting content illustrated in FIG. 2.

Referring to FIG. 7, the apparatus 200 for transmitting content transmits a request message for content requested by a client device 110 to a plurality of content servers 130-1, 130-2, and 130-*n* (710).

In this case, the apparatus 200 for transmitting content may identify the plurality of content servers 130-1, 130-2, and 130-*n* to which the request message is to be transmitted using a DNS lookup.

Subsequently, the apparatus 200 for transmitting content calculates a response delay time for each of the plurality of content servers 130-1, 130-2, and 130-*n* based on a response message of each of the plurality of content servers 130-1, 130-2, and 130-*n* for the request message (720).

Subsequently, the apparatus 200 for transmitting content may determine one or more content servers to which a byte range request for content is to be transmitted, from among the plurality of content servers 130-1, 130-2, and 130-*n*, based on at least one of the response message and the response delay time (730).

Thereafter, the apparatus 200 for transmitting content determines the size of the byte range request and the number of byte range requests for each of the one or more content servers (740).

At this time, the apparatus 200 for transmitting content may determine the size of the byte range request to be inversely proportional to the response delay time of each of the one or more content servers.

In addition, the apparatus 200 for transmitting content may determine the number of byte range requests to be proportional to the response delay time of each of the one or more content servers and to be inversely proportional to the number of connections to each of the one or more content servers.

Thereafter, the apparatus 200 for transmitting content acquires content from one or more content servers through byte range requests based on the size of the byte range request and the number of the byte range requests (750).

Figure 8:
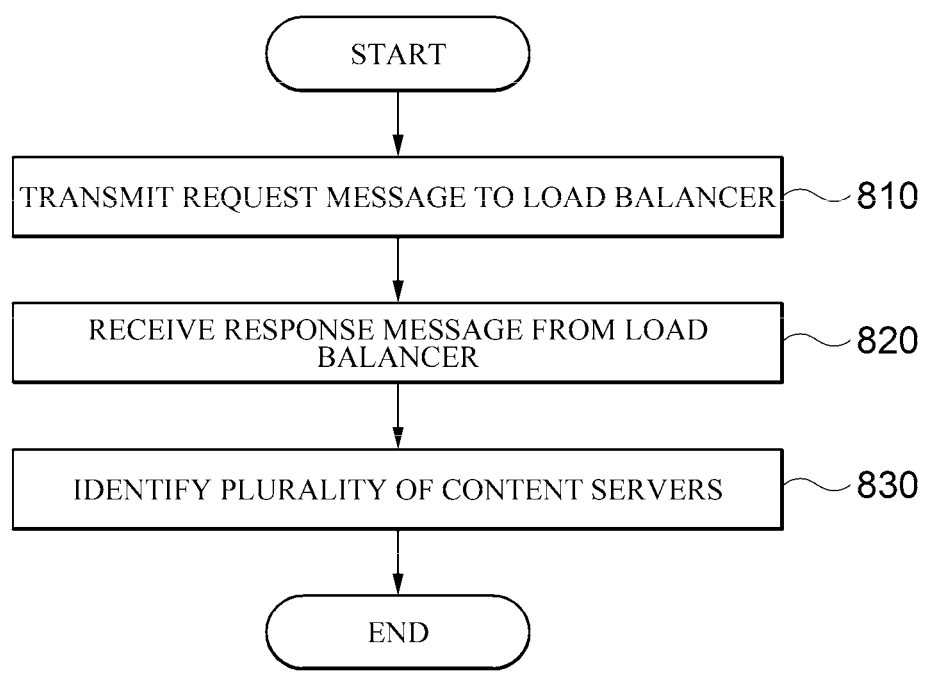
FIG. 8 is a flowchart illustrating a method of identifying a plurality of content servers according to one embodiment.

FIG. 8 is a flowchart illustrating a method of identifying a plurality of content servers according to one embodiment.

The method illustrated in FIG. 8 may be performed, for example, by the apparatus 200 for transmitting content illustrated in FIG. 2.

Referring to FIG. 8, the apparatus 200 for transmitting content may transmit a request message to a load balancer that performs load balancing on a plurality of content servers 130-1, 130-2, and 130-*n* (810).

Thereafter, the apparatus 200 for transmitting content may receive response messages, which have been transmitted by the plurality of content servers 130-1, 130-2, and 130-*n*, from the load balancer (820).

Subsequently, the apparatus 200 for transmitting content may identify the plurality of content servers 130-1, 130-2, and 130-*n* to which the request message is to be transmitted based on information included in a header of the received response messages (830).

Figure 9:
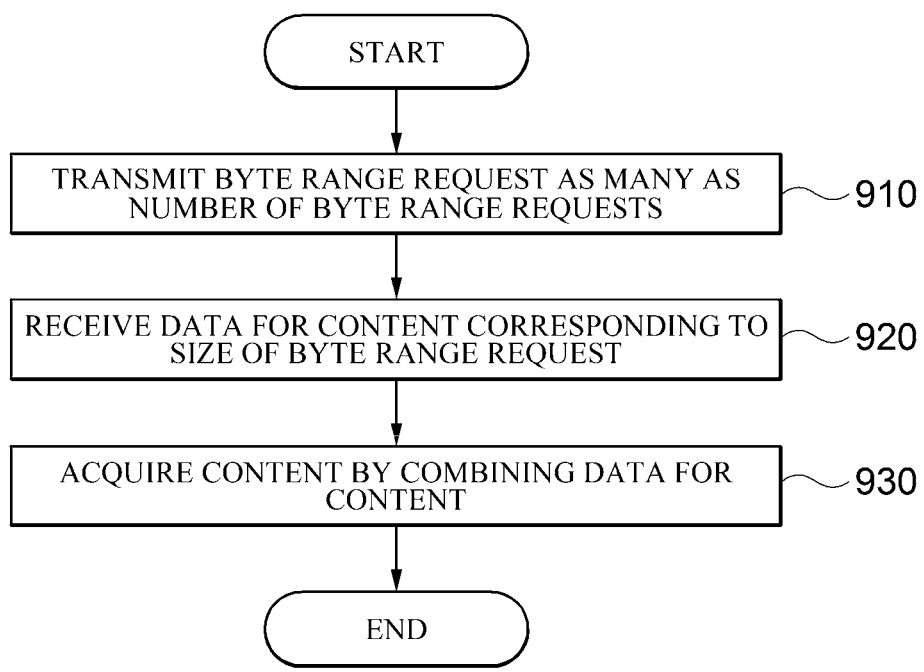
FIG. 9 is a flowchart illustrating a method of acquiring content by transmitting a byte range request according to one embodiment.

FIG. 9 is a flowchart illustrating a method of acquiring content according to one embodiment.

The method illustrated in FIG. 9 may be performed, for example, by the apparatus 200 for transmitting content illustrated in FIG. 2.

Referring to FIG. 9, the apparatus 200 for transmitting content may transmit a byte range request to each of the one or more content servers as many as the determined number of byte range requests of each of the one or more content servers (910).

Thereafter, the apparatus 200 for transmitting content may receive data for content corresponding to a size of the byte range request of each of the one or more content servers out of the total size of the content from each of the one or more content servers (920).

In this case, the apparatus 200 for transmitting content may receive the data for content by dividing the data by the number of byte range requests of each of the one or more content servers.

Thereafter, the apparatus 200 for transmitting content may acquire content by combining the data for the content received from each of the one or more content servers (930).

Meanwhile, in the flowcharts illustrated in FIGS. 7 to 9, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 10:
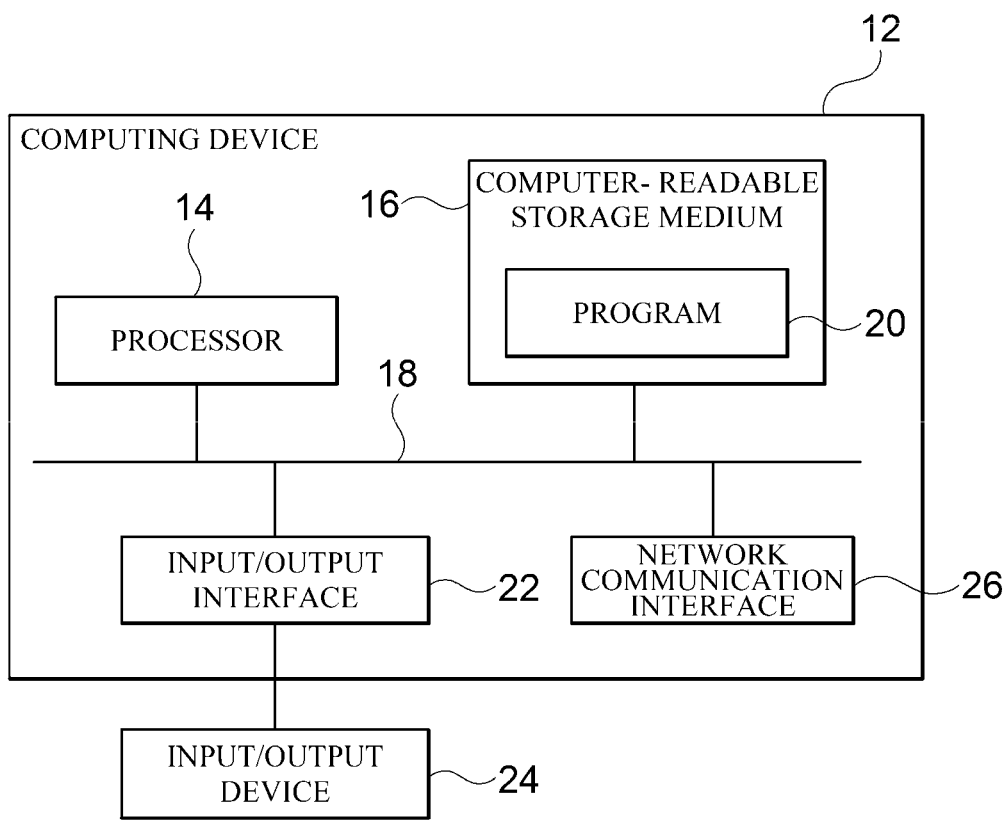
FIG. 10 is a block diagram for describing a computing environment including a computing device suitable for use in exemplary embodiments.

FIG. 10 is a block diagram for describing an example of a computing environment including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be, for example, one or more components included in the apparatus 200 for transmitting content illustrated in FIG. 2.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), nonvolatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, by acquiring content through byte range requests for each of the one or more content servers, it is possible to rapidly transmit large-capacity content and save time required to transmit large-capacity content.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for transmitting content, comprising:
a computer-readable storage medium storing one or more programs;
at least one processor configured to execute the one or more programs stored in the computer-readable storage medium; and
a communication bus connecting the processor and the computer readable storage medium,
wherein the one or more programs includes one or more computer executable instructions configured to:
transmit a request message for content requested by a client device to a plurality of content servers;
calculate a response delay time of each of the plurality of content servers based on a response message of each of the content servers for the request message;
determine one or more content servers to which a byte range request for the content is to be transmitted, from among the plurality of content servers, based on at least one of the response message and the response delay time and to determine a size of a byte range request and a number of byte range request for each of the one or more content servers; and
acquire the content from the one or more content servers through the byte range request based on the size of a byte range request and the number of byte range requests; and
determine the number of byte range requests to be proportional to the response delay time of each of the one or more content servers and to be inversely proportional to a number of connections to each of the one or more content servers.

2. The apparatus of claim 1, wherein the one or more computer executable instructions is further configured to identify the plurality of content servers to which the request message is to be transmitted by using a domain name system (DNS) lookup.

3. The apparatus of claim 1, wherein the one or more computer executable instructions is further configured to transmit the request message to a load balancer that performs load balancing on the plurality of content servers, receive the response message transmitted by the plurality of content servers from the load balancer, and identify the plurality of content servers to which the request message is to be transmitted based on information included in a header of the received response message.

4. The apparatus of claim 1, wherein the one or more computer executable instructions is further configured to transmit the byte range request to each of the one or more content servers as many as the number of byte range requests of each of the one or more content servers and receive data for the content corresponding to the size of the byte range request of each of the one or more content servers out of a total size of the content from each of the one or more content servers, wherein the data for the content is divided by the number of byte range requests of each of the one or more content servers.

5. The apparatus of claim 4, wherein the one or more computer executable instructions is further configured to acquire the content by combining the data for the content received from each of the one or more content servers.

6. A method of transmitting content, comprising:
transmitting a request message for content requested by a client device to a plurality of content servers;
calculating a response delay time of each of the plurality of content servers based on a response message of each of the content servers for the request message;
determining one or more content servers to which a byte range request for the content is to be transmitted, from among the plurality of content servers, based on at least one of the response message and the response delay time;
determining a size of a byte range request and a number of byte range request for each of the one or more content servers; and
acquiring the content from the one or more content servers through the byte range request based on the size of a byte range request and the number of byte range requests,
wherein the determining of the size of a byte range request and the number of byte range requests further comprises determining the number of byte range requests to be proportional to the response delay time of each of the one or more content servers and to be inversely proportional to a number of connections to each of the one or more content servers.

7. The method of claim 6, wherein the transmitting of the request message further comprises identifying the plurality of content servers to which the request message is to be transmitted by using a domain name system (DNS) lookup.

8. The method of claim 6, wherein the transmitting of the request message further comprises transmitting the request message to a load balancer that performs load balancing on the plurality of content servers, receiving the response message transmitted by the plurality of content servers from the load balancer, and identifying the plurality of content servers to which the request message is to be transmitted based on information included in a header of the received response message.

9. The method of claim 6, wherein the acquiring further comprises transmitting the byte range request to each of the one or more content servers as many as the number of byte range requests of each of the one or more content servers and receiving data for the content corresponding to the size of the byte range request of each of the one or more content servers out of a total size of the content from each of the one or more content servers, wherein the data for the content is divided by the number of byte range requests of each of the one or more content servers.

10. The method of claim 9, wherein the acquiring further comprises acquiring the content by combining the data for the content received from each of the one or more content servers.

* * * * *